US010569390B2

(12) United States Patent
Leys et al.

(10) Patent No.: US 10,569,390 B2
(45) Date of Patent: Feb. 25, 2020

(54) HIGH TORQUE POLYMER FITTINGS

(71) Applicant: ENTEGRIS, INC., Billerica, MA (US)

(72) Inventors: John A. Leys, Chaska, MN (US); Michael Schleicher, Eden Prairie, MN (US); Jeffrey J. McKenzie, Watertown, MN (US); Steven P. Kolbow, Chaska, MN (US)

(73) Assignee: ENTEGRIS, INC., Billerica, MA (US)

( * ) Notice: Subject to any disclaimer, the term of this patent is extended or adjusted under 35 U.S.C. 154(b) by 189 days.

(21) Appl. No.: 15/507,131

(22) PCT Filed: Aug. 26, 2015

(86) PCT No.: PCT/US2015/046972
§ 371 (c)(1),
(2) Date: Feb. 27, 2017

(87) PCT Pub. No.: WO2016/033198
PCT Pub. Date: Mar. 3, 2016

(65) Prior Publication Data
US 2017/0274507 A1    Sep. 28, 2017

Related U.S. Application Data

(60) Provisional application No. 62/042,120, filed on Aug. 26, 2014, provisional application No. 62/098,116, filed on Dec. 30, 2014.

(51) Int. Cl.
*B25B 13/50* (2006.01)
*F16L 47/04* (2006.01)
(Continued)

(52) U.S. Cl.
CPC ............. *B25B 13/50* (2013.01); *B25B 13/08* (2013.01); *F16L 33/226* (2013.01); *F16L 47/04* (2013.01);
(Continued)

(58) Field of Classification Search
CPC .......... B25B 13/50; B25B 13/08; F16L 47/04; F16L 33/226; F16L 2201/40; Y10S 285/919; Y10S 285/923
(Continued)

(56) References Cited

U.S. PATENT DOCUMENTS 5,154,453 A    10/1992    Nishio
6,142,535 A *  11/2000    Nishio ................. F16L 19/005
                                                    285/92

(Continued)

FOREIGN PATENT DOCUMENTS

CN    1610802 A    4/2005
CN    101025213 A    8/2007
(Continued)

OTHER PUBLICATIONS

"PrimeLock® Minimum Tube Unions"; Entegris Document/ Instruction Sheet. P/N 01-1023475, Revised May 2018; pulled from website https://www.entegris.com/content/dam/shared-product-assets/primelock-shared/instsheet-primelock-minimum-tube-7235.pdf on Jan. 25, 2019.

*Primary Examiner* — Greg Binda
(74) *Attorney, Agent, or Firm* — Entegris, Inc.

(57) ABSTRACT

A high torque polymer fittings useful in fluid handling systems. The fittings are especially useful for fluid handling fittings having diameters of one inch or greater. Various embodiments of the fittings disclosed accommodate specialized wrenches for securing the fittings, the wrenches being used to tighten the fittings to a desired torque.

3 Claims, 14 Drawing Sheets

(51) Int. Cl.
*F16L 33/22* (2006.01)
*B25B 13/08* (2006.01)

(52) U.S. Cl.
CPC ......... *F16L 47/041* (2019.08); *F16L 2201/40* (2013.01); *Y10S 285/919* (2013.01); *Y10S 285/923* (2013.01)

(58) Field of Classification Search
USPC ...................................... 285/23, 39, 92, 247
See application file for complete search history.

(56) References Cited

U.S. PATENT DOCUMENTS

| | | | |
|---|---|---|---|
| 6,409,222 | B1 | 6/2002 | Donoho et al. |
| 6,601,879 | B2 | 8/2003 | Donoho et al. |
| 6,692,036 | B2 * | 2/2004 | Kingsford ............... F16L 15/00 285/92 |
| 6,776,440 | B2 | 8/2004 | Nishio |
| 7,648,178 | B1 | 1/2010 | Andros |
| 7,789,433 | B2 | 9/2010 | Calnek |
| 2004/0144220 | A1 | 7/2004 | Stoick et al. |
| 2005/0077730 | A1* | 4/2005 | Thut ..................... F16L 37/248 285/401 |
| 2005/0081935 | A1 | 4/2005 | Shimizu |
| 2014/0210205 | A1 | 7/2014 | Yamada |

FOREIGN PATENT DOCUMENTS

| | | |
|---|---|---|
| CN | 103968163 A | 8/2014 |
| DE | 29818534 U1 | 4/2000 |
| EP | 1022504 A1 | 7/2000 |
| EP | 1243841 A1 | 9/2002 |
| EP | 2056009 A2 | 5/2009 |
| JP | 2006-017135 A | 1/2006 |
| JP | 2014145397 A | 8/2014 |
| WO | 2015/061501 A1 | 4/2015 |

* cited by examiner

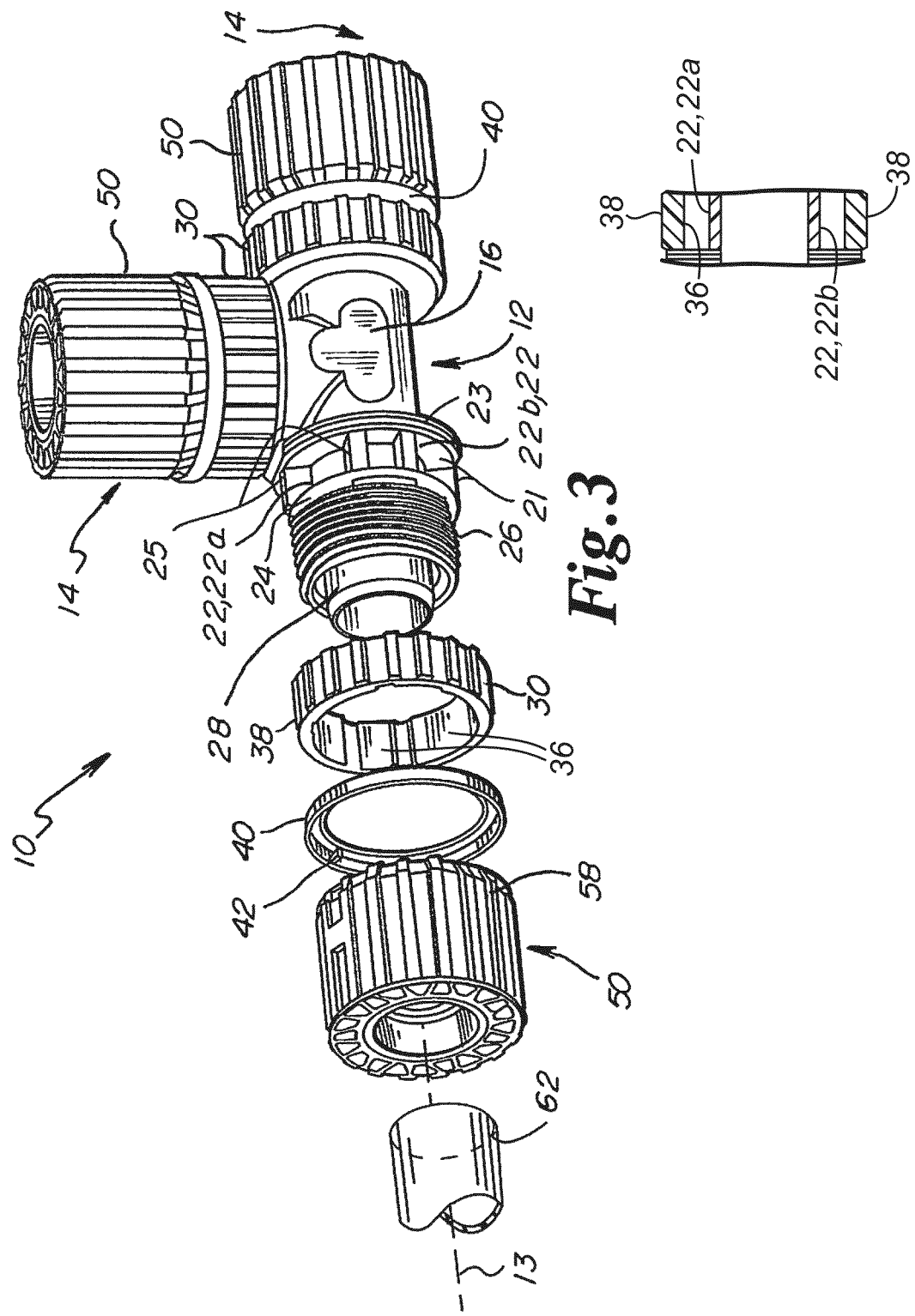

HIGH TORQUE POLYMER FITTINGS

RELATED APPLICATIONS

This application is a National Phase entry of PCT Application No. PCT/US2015/046972, filed Aug. 26, 2015, which claims the benefit of U.S. Provisional Patent Application No. 61/042,120, filed Aug. 26, 2014, and of U.S. Provisional Patent Application No. 62/098,116, filed Dec. 30, 2014, both disclosures of which are hereby incorporated by reference in their entirety.

FIELD OF THE DISCLOSURE

This disclosure relates generally to connector fittings for liquid handling, and more specifically to high torque polymer fittings for high purity chemical handling.

BACKGROUND OF THE DISCLOSURE

Fluid handling systems offering corrosive resistance and high purity have many applications in advanced technologies. These applications include solar, LED, flat panel display technologies and in the semiconductor industry for applications such as photolithography, bulk chemical delivery, chemical mechanical polishing, wet etch and clean. In order to provide the corrosive resistance, inert properties are required for high purity applications. Current fittings for such liquid handling systems are made from perfluoroalkoxy alkane (PFA), ethylene tetrafluoroethylene (ETFE), fluorinated ethylene propylene (FEP). Besides providing non-corrosive and inert construction, many fluoropolymers, such as PFA, are injection moldable.

Several types of connector fittings are available and are known as PRIMELOCK® fittings and pillar fittings and typically connect a tubing end shaped to be bulbous with and utilizing a ring shaped spacer. PRIMELOCK® is a registered trademark of Entegris, Inc., of Billerica, Mass., U.S.A., owner of the present application.

While the use of melt processible resins has provided the inertness, resistance and the ability to mold components of fluid handling systems to just about any shape or size, the tensile strength and compressive strength of the material is lower than conventional metal used for fittings. For example, the tensile strength of PFA is 24 MPa (megaPascals, or $10^6$ Pascals), of FEP is 23 MPa, and of ETFE is 40-46 MPa. In contrast, the tensile strength of 316 stainless steel is 276 MPa. Fittings on plumbing components have a nut which is tightened on the body of the fitting. The fitting body is typically an integral or unitary part of a plumbing component or equipment such as a T, a reducer, an elbow, a valve, a filter, a measurement device, or other equipment or apparatus. Often, particularly for larger fittings, in order to tighten the nut, the body must be secured. Conventionally, this may be provided by flats on the body that will receive the parallel faces of a conventional open-ended wrench. The flats may be part of a hex with the shape of a conventional nut or be two flats where the fitting body is part of a "T" fitting for example. Typically the flats are spaced apart on the body a distance of 20 to 60% of the diameter of the interior fluid flow conduit. Particularly for larger PFA fittings, such as for 1½ inch flow conduits or greater, the high torque forces required to tighten fittings, which are typically 250 ft-lbf or greater, together with the inherent slipperiness and the easy compressibility of the material, utilizing such conventional wrenches to secure the body may cause the wrench to slip off of the body, potentially damage the body, and/or make adequate tightening of the fitting problematic.

Improved fittings and tightening appurtenances and methods for larger polymer couplings would be a welcomed contribution.

SUMMARY OF THE DISCLOSURE

In various embodiments of the disclosure, high torque polymer fittings and tools useful in ultra-pure applications are provided, for example in the fields of electronics, solar, LED and flat panel display technologies and generally in the semiconductor fabrication industry. Some embodiments of the disclosure provide coupling fittings for use in liquid handling systems. The fittings provide an improved ability to tighten the fittings, especially fittings with large outer diameters such as greater than 1 inch or greater than 1½ inch where the torque required to tighten the fittings is about 250 inch-lbf or more.

The embodiments disclosed herein are suitable for use with PRIMELOCK® fittings, pillar fittings, flared fittings, and other fittings. Example fittings are illustrated by U.S. Pat. Nos. 6,601,879, 6,776,440, 7,789,433, 5,154,453, 6,409,222, which are hereby incorporated by reference herein in their entirety except for express definitions and patent claims contained therein. Components and features of these patents may be suitable for use with various embodiments disclosed herein.

High purity liquid handling systems have many applications in industries such as solar, LED, flat panel display technologies and in the semiconductor industry for applications such as photolithography, bulk chemical delivery, chemical mechanical polishing, wet etch and clean. Further, the use of corrosive chemicals used in these applications precludes the use of some conventional liquid handling technology because of the effect on components of the chemicals which may lead to corrosion of the components and leaching of chemicals into the environment. Such substances were recently the subject of a new directive in the European Union to limit the presence of such substances used in electronic equipment such as those used in the semiconductor industry.

Because of the use of corrosive chemicals, sometimes at increased pressures, the industry has begun using component parts made out of inert polymers. Such components include fittings, piping and valves used in bulk liquid handling systems. Such inert polymers include those containing fluorine due to the increased stability of fluorinated polymers and easy melt possibility. However, while such polymers are inert and useful for use with corrosive chemicals, they are easily deformable (compared to hard materials such as steel or iron), have a low tensile strength, and are slippery compared to metals. The larger the fittings the more torque that has to be applied to adequately tighten them. However, due to the design of such fittings, there is little space on the fitting for holding the fitting securely while tightening the threaded components on the fittings.

Structurally, in various embodiments of the disclosure, a connector fitting for fluid handling is disclosed, the connector fitting comprising a coupling leg defining a bore that extends therethrough, the coupling leg and the bore being concentric about a leg axis, the coupling leg including a neck portion, a shoulder portion extending distal to the neck portion, a threaded portion extending distal to the threaded portion, and a nipple portion extending distal to the threaded portion, the neck portion including locking features extending radially outward therefrom. A nut is threadably engaged with the threaded portion of the coupling leg. The coupling leg and the nut may be made of a melt processible resin. In various embodiments, the connector fitting is molded and/or machined. In some embodiments, the connector fitting is made from at least one of perfluoroalkoxy alkane (PFA), ethylene tetrafluoroethylene (ETFE), and fluorinated ethylene propylene (FEP).

In some embodiments of the disclosure, the locking features include a plurality of protrusions that are distributed about the leg axis at uniform angular intervals. The locking features may also include a flange portion concentric about the respective leg axis and extending radially outward from the neck portion. In some embodiments, each of the plurality of protrusions extend distally from the flange portion and proximally from the shoulder portion. The plurality of protrusions may be at least three protrusions and, in some embodiments, no more than eight protrusions. In some embodiments, the plurality of protrusions is four protrusions. In various embodiments, each of the plurality of protrusions include opposing flat sides that face tangentially about the leg axis and a flat top that faces radially outward from the leg axis.

In some embodiments of the disclosure, the locking features include a flange extending radially outward from the neck portion and a plurality of partitions extending distally from the flange, the flange and the plurality of partitions cooperating to define a plurality of pockets. In some embodiments, each of the plurality of pockets are accessible from a distal end of the neck portion. In various embodiments, the connector fitting includes a locking ring that defines and is concentric about a locking ring axis, the locking ring including an inner surface that includes one or more tabs that project radially inward toward the locking ring axis, the one or more tabs being configured to mate within one or more of the plurality of pockets. The locking ring includes an outer surface that may include a plurality of ribs that project radially outward, the plurality of ribs being uniformly distributed about and parallel to the locking ring axis to define a plurality of channels. In some embodiments, the one or more tabs of the locking ring are disposed within the one or more of the plurality of pockets of the neck portion, the partitions contacting with the one or more tabs so that the locking ring is non-rotatable with respect to the neck portion. In some embodiments, the one or more tabs of the locking ring are disposed within the one or more of the plurality of pockets of the neck portion, the partitions contacting with the one or more tabs to limit the locking ring to a within a range of rotation about the locking ring axis relative to the neck portion. In some embodiments, the range of rotation is less than 15 degrees; in some embodiments, the range of rotation is less than 10 degrees; in some embodiments, the range of rotation is less than 5 degrees; in some embodiments, the range of rotation is less than 2 degrees.

In some embodiments of the disclosure, the locking features include a plurality of spacers on opposing sides of the neck portion, the spacers extending orthogonal to the leg axis and including first and second opposing ends, wherein the first opposing ends of the plurality of spacers define a first plane, and the second opposing ends of the plurality of spacers define a second plane, the first plane and the second plane being parallel to each other and on opposing sides of the coupling leg. The spacers may be tubular portions that define a passageway therethrough and openings on the first and second opposing ends. The tubular portions may define a circular cross-section.

In various embodiments of the disclosure, a wrench is disclosed for tightening the connector fitting having the plurality of protrusions, the wrench comprising: a first head having a body portion; a first leg and a second leg extending in opposing directions from the body portion; a first tooth that cooperates with the first leg to define a first notch on the first leg; a second tooth that cooperates with the body portion to define a second notch on the body portion; and an end boss defined at a distal end of the second leg, wherein the first notch, the second notch, and the end boss are centered about a rotation axis. In some embodiments, the wrench includes a handle portion, wherein the first head is disposed at a first end of the handle portion, the handle portion defining a handle axis. A second head may also be included at a second end of the handle portion, the second head including an arcuate spanner portion having an inside surface, a plurality of teeth protruding from the inside surface. In various embodiments, the first notch defines a first lead in and the second notch defines a second lead in. In some embodiments, the body portion is centered about the handle axis; in other embodiments, the handle axis passes through one of the first leg and the second leg.

In various embodiments of the disclosure, a method of installing the connector fitting having the plurality of protrusions is disclosed, comprising:
providing at least one wrench as described above;
providing a set of installation instructions, the installation instructions comprising:
  securing the connector fitting by bringing the first notch of the wrench into contact with a first of the plurality of protrusions, the second notch into contact with a second of the plurality of protrusions, and the boss end into contact with a third of the plurality of notches; and
  tightening the nut onto the threaded portion of the coupling leg.

In some embodiments, the wrench provides a body having at least two pins extending perpendicularly therefrom the pins dimensioned and configured to mate with one or more tubular portions disposed on the surface of a fitting. In other embodiments the wrench has two legs extending perpendicularly from the body while in still other embodiments, the wrench has two legs extending from the body and has four pins, two each opposing aligned from each other on each of the two legs. The pins are dimensioned and configured to mate with the first and second opening of a first and second tubular portion disposed on the fitting body.

These and other features and advantages of various embodiments of the methods are described in, or are apparent from, the following detailed description of various embodiments of the methods according to this disclosure.

BRIEF DESCRIPTION OF THE FIGURES

FIG. 3 is a partially exploded, front perspective view of the connector fitting of FIG. 2A in an embodiment of the disclosure;

FIG. 3A is a partial cross-sectional view of the connector fitting of FIG. 3.

DETAILED DESCRIPTION OF THE DRAWINGS

Figure 1A:
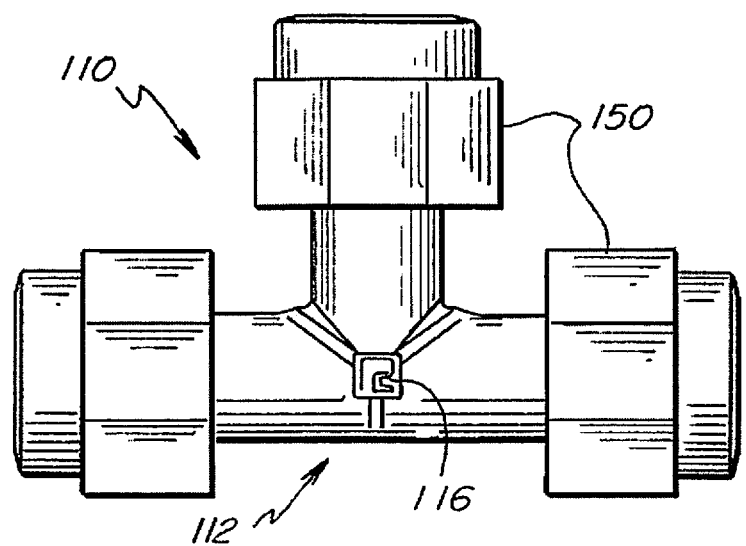
FIG. 1A is a front elevational view of a conventional fluid fitting with the torque nuts and hardware assembled.
Figure 1B:
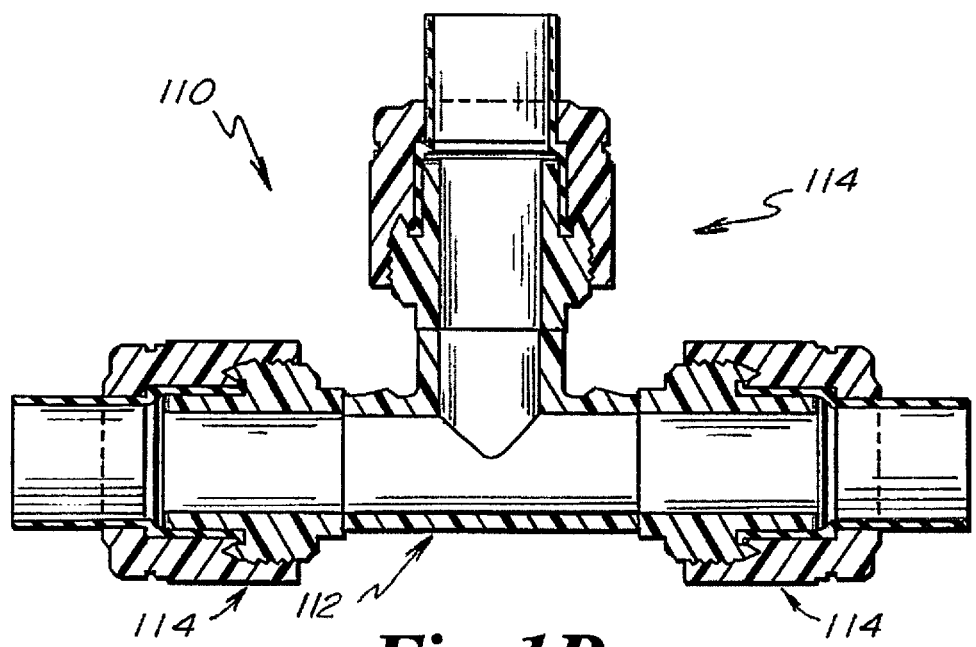
FIG. 1B is a front sectional view of the fluid fitting of FIG. 1A in assembly.
Figure 2A:
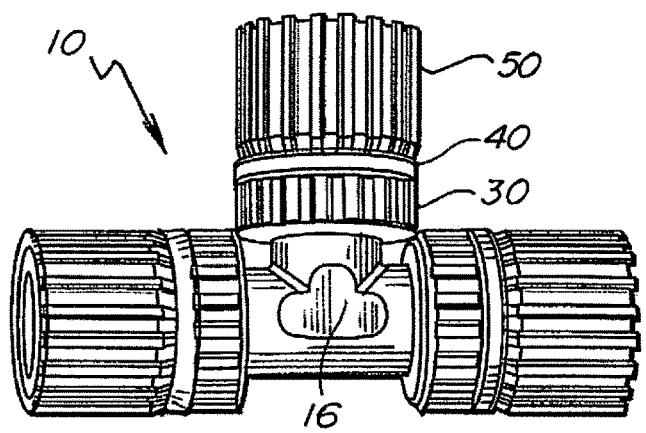
FIG. 2A is a front perspective view of a connector fitting in an embodiment of the disclosure.
Figure 2B:
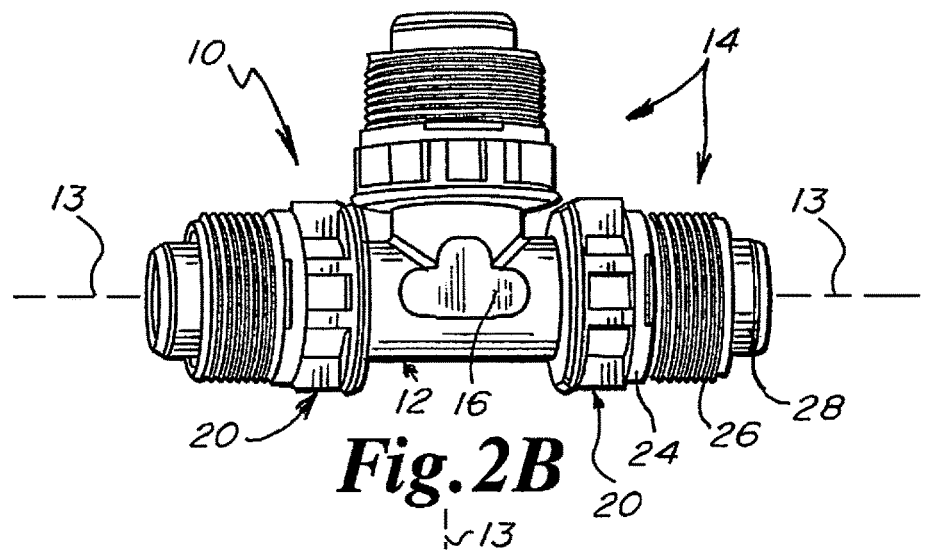
FIG. 2B is a front perspective view of a fitting body and coupling legs of the connector fitting of 2A in an embodiment of the disclosure.
Figure 2C:
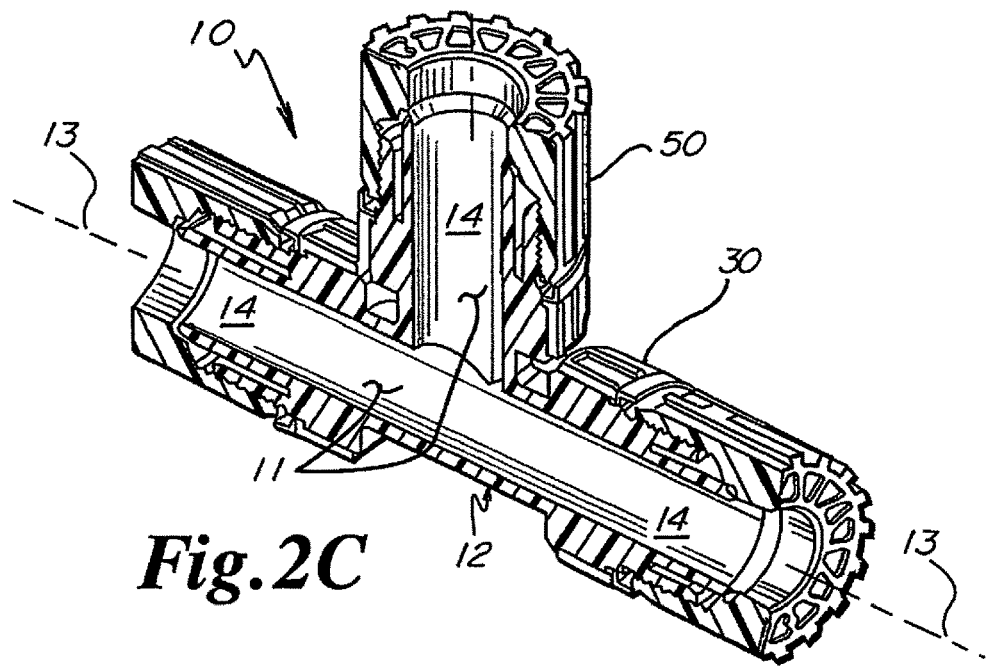
FIG. 2C is a sectional view of the connector fitting of FIG. 2A.

Referring to FIGS. 1A and 1B, a conventional fitting 110 is depicted. The fitting body 112 of FIG. 1B includes hardware 150 in cross-section of the fitting illustrated in FIG. 1A. The fitting body 112 provides a small flat portion 116 suitable for holding the fitting while tightening nuts 150 on the fitting. Due to the high torque needed to tighten large diameter fittings and the low tensile strength of the fitting body 112, the small surface area provided by flat portion 116 often does not enable a wrench to hold the fitting 112 securely to tighten a nut 150 before the fitting breaks or the surface area of the flat portion 116 deforms.

Recognizing this deficiency, the embodiments of the present disclosure have been developed for use in liquid handling systems.

Referring to FIGS. 2A through 4C, a connector fitting 10 is depicted in an embodiment of the disclosure. The connector fitting 10 includes a fitting body 12 and at least one coupling leg 14. Each coupling leg 14 defines a bore 11 concentric about a leg axis 13, the bore 11 passing through the coupling leg 14 and body 12. The connector fitting 10 may include opposing flats 16 on lateral sides of the fitting body 12 and may further include three coupling legs 14, which may be identical. For the depicted embodiment of connector fitting 10, each coupling leg 14 includes a neck portion 20, a threaded portion 26 distal to the neck portion 20, and a nipple portion 28 distal to the threaded portion 26. In various embodiments, a shoulder portion 24 separates the neck portion 20 from the threaded portion 26. Herein, the "distal" direction of a coupling leg 14 is the direction extending from the neck portion 20 toward the nipple portion 28. The coupling leg 14 may be made of melt processible resin.

While the example embodiment illustrated in FIGS. 2A through 4C have three identical coupling legs 14, the coupling legs 14 may be of different diameters and lengths, and may be step-down or step-up type fittings. Also, while the connector fitting 10 depicted is a "T" union connector, other suitable fitting types are also contemplated, including but not limited to a single fitting, a double fitting, a cross fitting, a reducer, an elbow, a valve, a filter, a measurement device, or other equipment or apparatus.

In some embodiments, the neck portion 20 includes one or more locking features 21. For the connector fitting 10, the locking features 21 comprise a flange 23 and at least one partition 25 that extends radially outward from the neck portion 20. For the depicted embodiment of connector fitting 10, there are a plurality of partitions 25 that extend distally from the flange 23 and substantially parallel to the leg axis 13. The flange 23 and partitions 25 define one or more grooves or pockets 22. The pockets 22 are accessible from the distal end of the neck portion 20.

Figure 4:
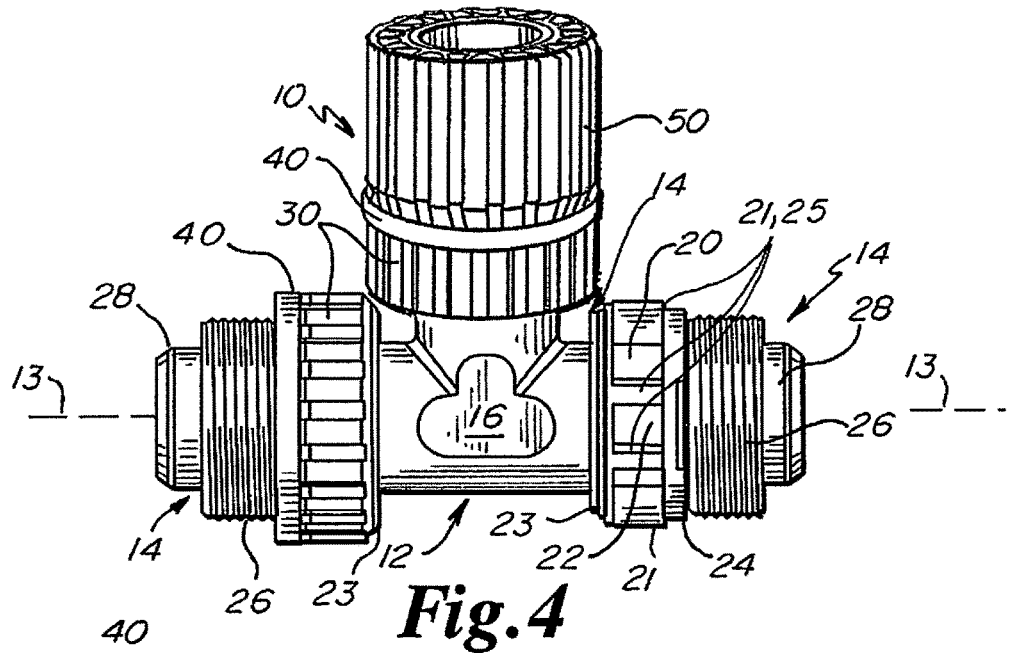
FIG. 4 is a perspective view of the fitting of FIG. 2A in partial assembly.
Figure 4A:
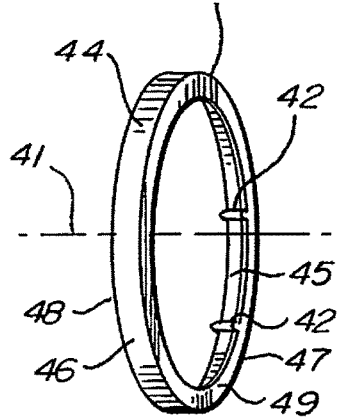
FIG. 4A is a perspective view of a connection verification ring used on the connector fitting of FIG. 4.
Figure 4B:
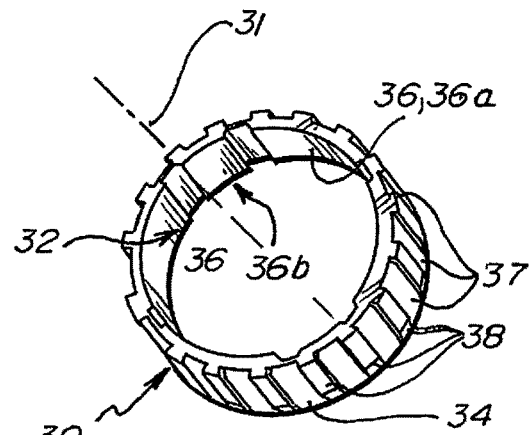
FIG. 4B is a perspective view of a lock ring of the fitting of FIG. 4 in an embodiment of the disclosure.

In certain embodiments, the connector fitting 10 includes a collar or locking ring 30 concentric about a locking ring axis 31 (FIG. 4B). The locking ring 30 includes an outer surface 34 and an inner surface 32. The inner surface 32 may include one or more tabs 36 that project radially inward from the inner surface 32, the tabs 36 being configured to mate with the pockets 22 of the neck portion 20. In some embodiments, a plurality of ribs 38 are defined on the outer surface 34 of the locking ring 30, the ribs 38 extending parallel to the locking ring axis 31. The ribs 38 may be uniformly distributed about the locking ring axis 31. The plurality of ribs 38 define a plurality of channels 37 on the outer surface 34 of the locking ring 30, the channels 37, like the ribs 38, extending parallel to the locking ring axis 31.

In some embodiments, the neck portion 20 provides two or more pockets 22, with at least one of the pockets (e.g., pocket 22b of FIG. 3) having different dimensions than the other pockets (e.g., pocket 22a of FIG. 3). For the depicted embodiment of the connector fitting 10, the differing dimension is affected by a differing angular dimension about the leg axis 13. The corresponding tabs 36 of the locking ring 30 may be dimensioned to mate with a corresponding one of the pockets 22, thereby providing a keyed relationship between the locking ring 30 and the neck portion 20 (FIG. 3A). The artisan will recognize other ways to differentiate the dimensions of the pockets 22 and tabs 36, including differing radial depths and thicknesses and/or differing axial depths and thicknesses of the pockets 22 and tabs 36.

In some embodiments, the connector fitting 10 includes a connection verification ring 40 (FIG. 4A). The connection verification ring 40 is concentric about a ring axis 41 and includes an outer surface 44 and an inner surface 45. In certain embodiments, the connection verification ring 40 includes an outer ring portion 46 having a proximal end 47 and a distal end 48, and a flange portion 49 extending radially inward (i.e., toward the ring axis 41) from the proximal end 47 of the outer ring portion 46. The connection verification ring 40 may include one or more locking tabs 42 projecting from the inner surface 46. In the depicted embodiment, the locking tabs 42 extend radially inward from the outer ring portion 46 and axially (i.e., parallel to the ring axis 41) from the flange portion 49.

Figure 4C:
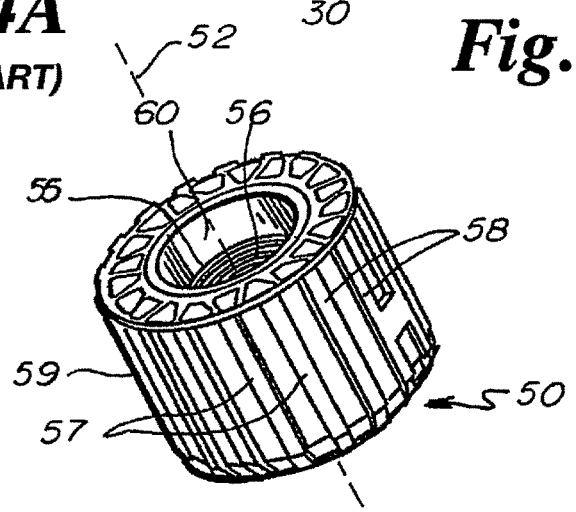
FIG. 4C is a perspective view of a nut used on the connector fitting of FIG. 4.

In various embodiments, the threaded portion 26 is configured to threadably engage a nut 50 (FIG. 4C). The nut 50 is concentric about a nut axis 52. In some embodiments, the nut 50 includes an inner surface 55 (FIG. 4C) that defines a bore 60 and a threaded portion 56, the threaded portion 56 being configured to mate with the threaded portion 26 of the coupling leg 14. In the depicted embodiments, an outer surface 59 of the nut 50 includes a plurality of ribs 58 symmetrically disposed about the outer surface 59 and extending parallel to the nut axis 52. The plurality of ribs 58 define a plurality of channels 57 on the outer surface 59 of the nut, the channels 57, like the ribs 58, extending parallel to the nut axis 52. The dimensions and spacing of the ribs 58 and channels 57 on nut 50 can be the same as that of the ribs 38 and channels 37 on the locking ring 30. The nut 50 may be made of melt processible resin.

Figure 5A:
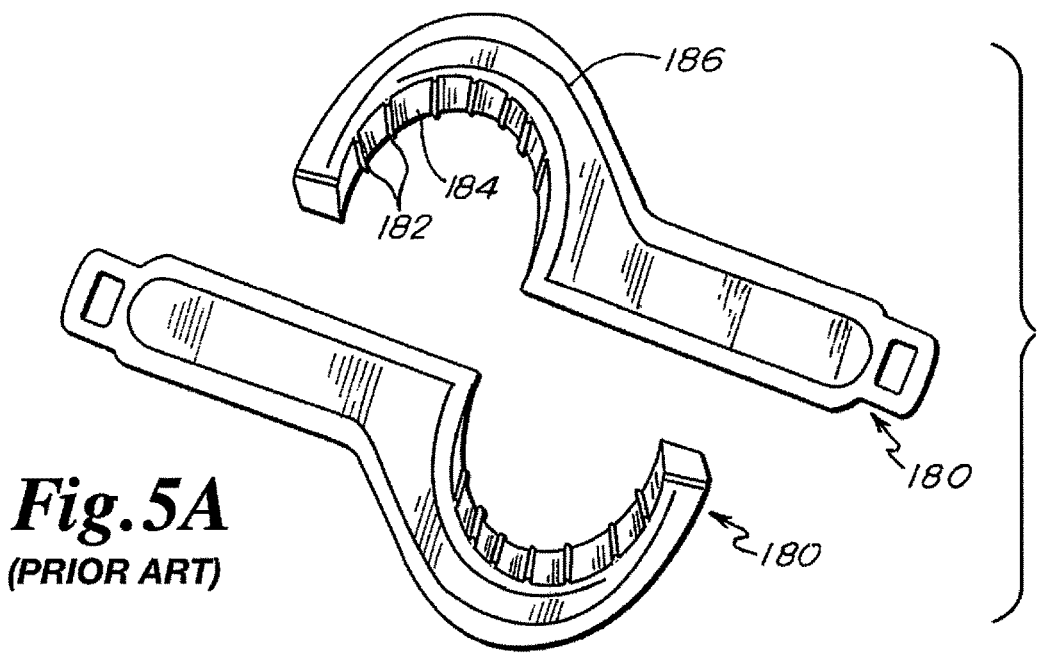
FIG. 5A illustrates conventional wrenches for tightening connector fittings.
Figure 5B:
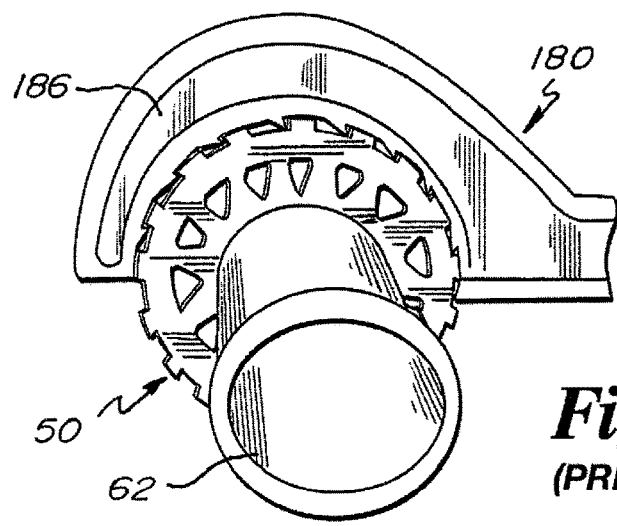
FIG. 5B is a perspective view of a conventional wrench tightening a conventional nut.
Figure 5C:
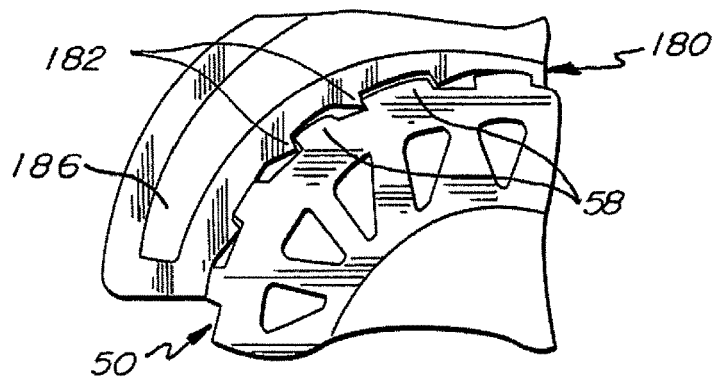
FIG. 5C is a partial, enlarged view of FIG. 5B.

Referring to FIGS. 5A through 5C, rotation of the nut 50 with a wrench 180 is depicted. The wrench 180 has teeth 182 regularly spaced on an inside surface 184 of an arcuate spanner portion 186. In one embodiment, the spacing of the channels 37 and 57 of the locking ring 30 and the nut 50 and the spacing of the teeth 182 of the wrench 180 are dimensioned for operational alignment.

In various embodiments, a set of installation instructions for installing the connector fitting 10 are provided on a tangible and non-transitory medium as follows: In assembly, various components of the connector fitting 10 are arranged as depicted in FIG. 3 for coupling with a tubing 62. The locking ring 30 is oriented and slid onto the neck portion 20 along the leg axis 13 and over the shoulder portion 24 so that the tabs 36 are registered within the pockets 22. After placement of the locking ring 30, the connection verification ring 40 is placed on the coupling leg 14 with the flange portion 49 registered against the shoulder portion 24. The nut 50 is threaded onto the threaded portion 26 of the coupling leg until the bore 60 of the nut 50 abuts or nearly abuts the nipple portion 28 of the coupling leg 14. The tubing 62 is inserted through the bore 60 of the nut 50 and into the bore 11 of the nipple portion 28. The nut 50 may be tightened by using wrench 180 to engage the ribs 38 and channels 37 of the locking ring 30, thereby holding the connector fitting 10 steady while a separate wrench 180 is used to engage the ribs 58 of the nut 50. In certain embodiments, the tightening of the nut 50 exerts a radial compression force on the tubing 62.

In various embodiments, the installation instructions are provided with the fitting 10 and/or the wrench or wrenches 180 as part of a kit. Herein, a "tangible and non-transitory medium" includes one or more of a paper document, a computer readable storage medium such as a compact disc, hard disc, flash drive, or other suitable tangible medium. In some embodiments, the computer readable storage medium is a tangible device that retains and stores instructions for use by an instruction execution device. A tangible and non-transitory medium, as used herein, is not to be construed as being the transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Functionally, the tabs 36 of the lock ring 30 within the pockets 22 of the neck portion 20 restricts rotation of the locking ring 30 with respect to the neck portion 20 (FIG. 3A). In some embodiments, the locking ring 30 is assembled to the neck portion 20 with a clearance fit, such that a range of rotation of the locking ring 30 relative to the neck portion 20 is limited. In some embodiments, the range of rotation is less than 15°; in some embodiments, the range of rotation is less than 10°; in some embodiments, the range of rotation is less than 5°; in some embodiments, the range of rotation is less than 2°.

In some embodiments, rather than a clearance fit, a press fit is implemented between the locking ring 30 and the neck portion 20, and the range of rotation is effectively zero; that is, the locking ring 30 is non-rotatable with respect to the neck portion 20. The non-rotatable condition can be accomplished, for example, by dimensioning one or more of the tabs 36 for a press fit into the respective groove 22. In some embodiments, the non-rotatable condition can be affected by bonding the locking ring 30 to the neck portion 20 with an adhesive or by a fusing process.

Engagement of the plurality of teeth 182 with the plurality of ribs 38 and 58 spreads the shear loads on outer surfaces 34 and 59 of the locking ring 30 and the nut 50 over a greater area than would, for example, the corners of the flats of the conventional fitting 110 and nuts 150 of FIGS. 1A and 1B. Furthermore, should the torque deform the locking ring 30, the deformed locking ring can be readily replaced, at least for the various embodiments where the locking ring 30 is clearance fit onto the locking features 21 of the neck portion 20.

The function of the connection verification ring 40 is to provide visual and audible verification that the nut 50 is properly secured to the coupling leg 14, as described, for example, in "PrimeLock® Minimum Tube Unions," P/N 01-1023457 (Rev. C March 2013), March 2013, available at http://www.entegrisfluidhandling.com/Documents/3110-7235-0313.pdf, last visited on Aug. 24, 2015, the disclosure of which is hereby incorporated by reference herein in its entirety except for express definitions contained therein.

Figure 6A:
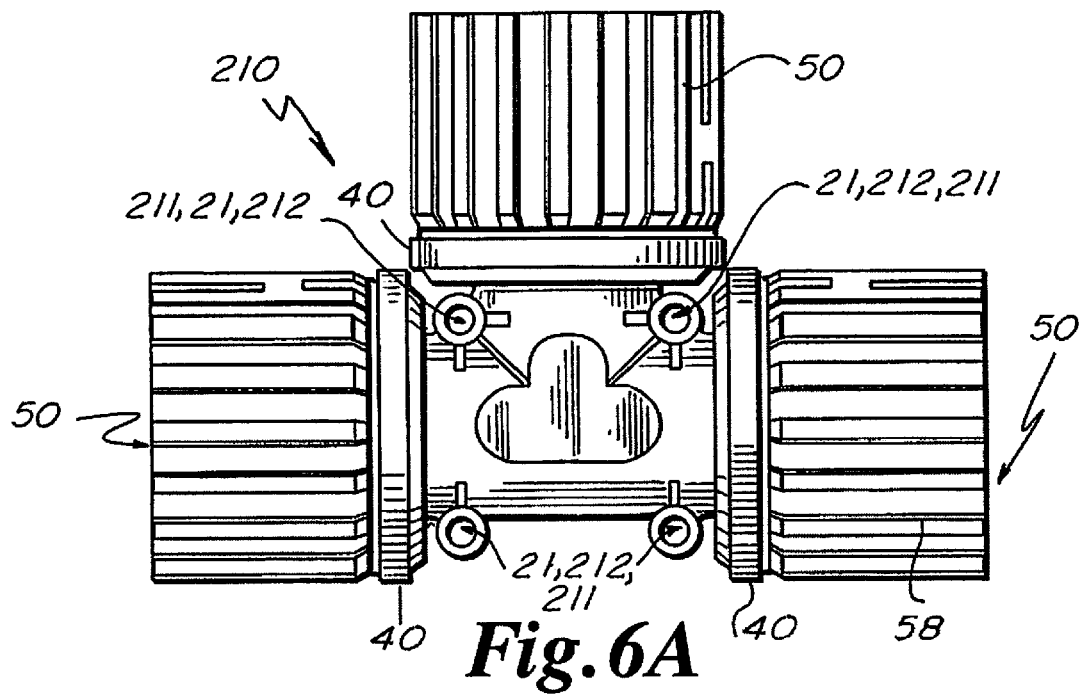
FIG. 6A is an elevational view of a connector fitting in an embodiment of the disclosure.
Figure 6B:
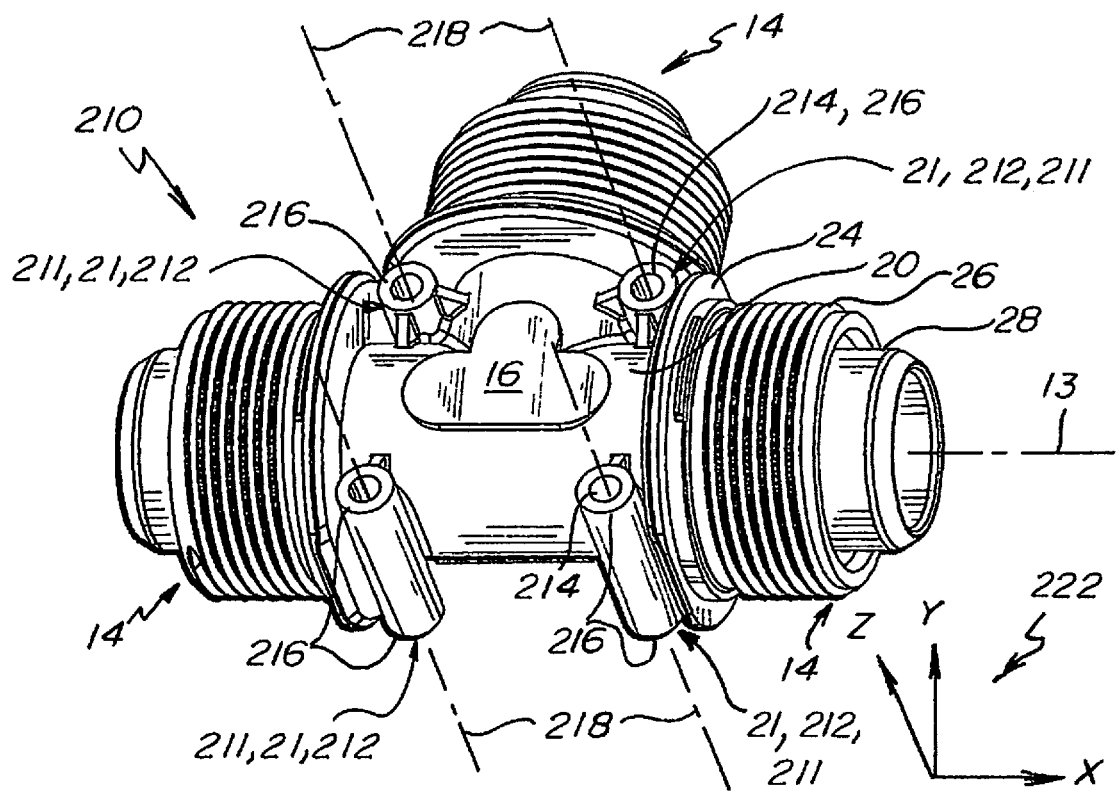
FIG. 6B is a bottom-front perspective view of a body and coupling legs of the connector fitting of FIG. 6A in an embodiment of the disclosure.

Referring to FIGS. 6A and 6B, a connector fitting 210 is depicted in an embodiment of the disclosure. The connector fitting 210 may include many of the same components and attributes as the connector fitting 10, which are indicated with same-numbered numerical references. For the connector fitting 210, the locking features 21 of the neck portion 20 are spacers 211 that extend orthogonal to said leg axis 13, the spacers 211 each having first and second opposing ends 216. The spacers 211 may be laterally centered with respect to the leg axis 13. The spacers 211 of a given neck portion 20 may be aligned at the same axial location on the respective leg axis 13 (i.e., aligned in the y-direction of a Cartesian coordinate 222).

In various embodiments, the first opposing ends 216 of the plurality of spacers define a first plane, and the second opposing ends 216 of the plurality of spacers define a second plane. In some embodiments, the first plane and the second plane are parallel to each other and straddle the coupling leg 14 on opposing sides. In the depicted embodiments, the first and second planes are defined laterally outward of the flats 16.

In the depicted embodiments of the connector the fitting 210, the spacers 211 are tubular portions 212 that define a passageway therethrough and openings 214 on the opposing ends 216 of the tubular portions 212. The tubular portions 212 each define a tube axes 218 that extend in a direction (e.g., parallel to the z-axis of the Cartesian coordinate 222 of FIG. 6B) that is substantially orthogonal to a direction (e.g., parallel to the x-axis of the Cartesian coordinate 222) of the leg axis 13. In various embodiments, the ends 216 on a given side of the connector fitting 210 lie on a common plane that is orthogonal to the tube axis 218 (i.e., parallel to the x-y plane of the Cartesian coordinate 222), such that the opposing ends 216 of each of the tubular portions 212 lie on two planes that are parallel to each other.

Figure 7A:
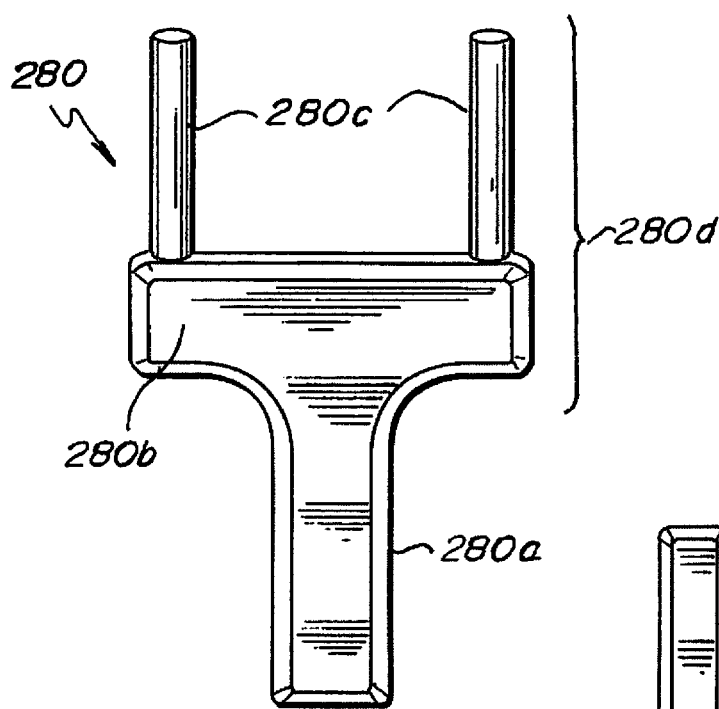
FIGS. 7A through 7C are plan views of specialized wrenches useful for tightening the connector fitting of FIG. 6A in embodiments of the disclosure.
Figure 7B:
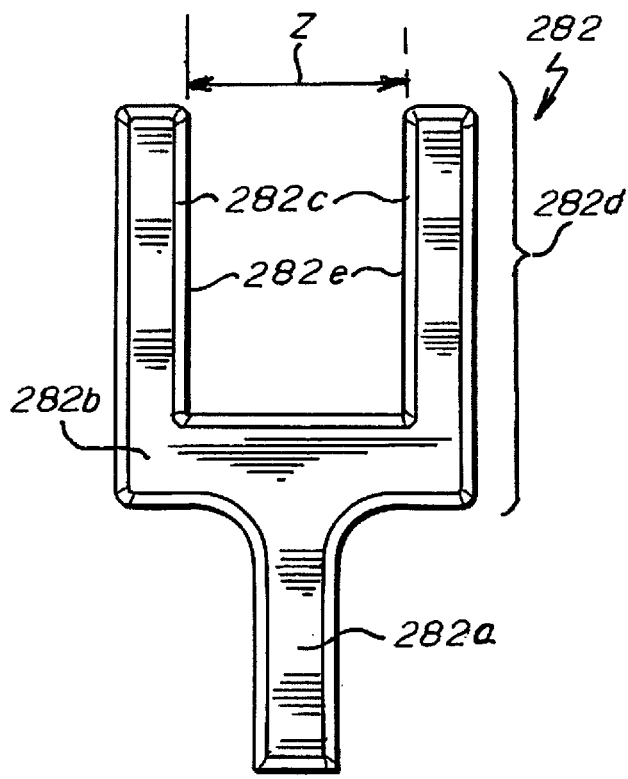
Figure 7C:
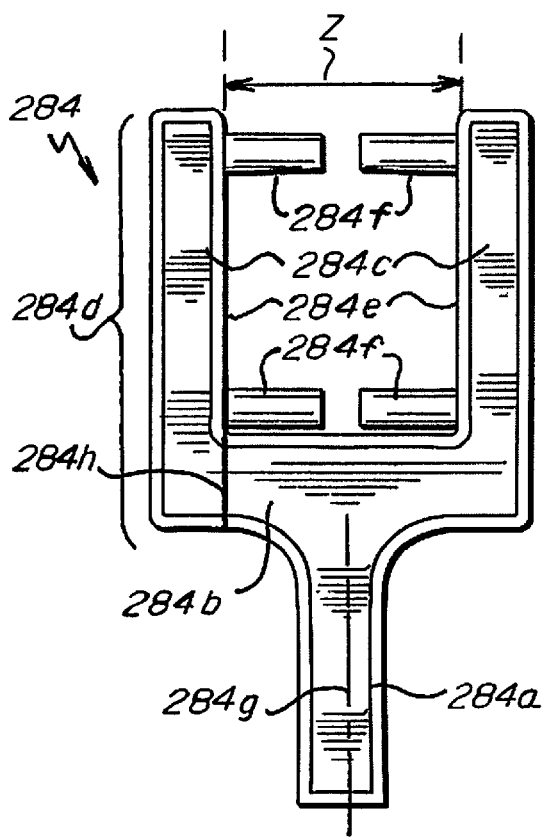

Referring to FIGS. 7A through 7C, a variety of wrenches 280, 282, and 284 for use with the connector fitting 210 are depicted in embodiments of the disclosure. The wrench 280 (FIG. 7A) includes a handle 280a and yoke 280d, the yoke 280d including a body 280b and two prongs 280c. The prongs 280c are dimensioned and configured to mate with a sliding fit within tubular portions 212 on the neck portion 20 of the connector fitting 210.

The tubular portions 212 are depicted as having circular cross-sections. However, other cross-sectional geometries are contemplated, including but not limited to rectangular, square, triangular, polygonal, and elliptical.

The wrench 282 (FIG. 7B) includes a handle 282a and a yoke 282d, the yoke 282d including a body 282b and a pair of opposed legs 282c extending from the body 282b. The opposed legs 284c include inside faces 282e that face each other. The wrench 282 is suitable for use with embodiments of the connector fitting 210 wherein the opposing ends 216 of each of the tubular portions 212 lie on two planes that are parallel to each other. The legs 282c are spaced apart at an inside dimension Z that enables sliding engagement with and over the opposed ends 216 of the spacers 211. In operation, the legs 282c of the wrench 282 register on the ends 216 of the spacers 211 of the neck portion 20 to stabilize the connector fitting 210.

The wrench 284 (FIG. 7C) includes a handle 284a and a yoke 284d, the yoke 284d including a body 284b, a pair of opposed legs 284c extending from the body 284b. The opposed legs 284c include inside faces 284e that face each other and at least one pin 284f projecting from each of the inside faces 284e toward a central axis 284g. Each pin 284f on each leg 284c is dimensioned and configured to mate with a sliding fit within tubular portions 212 on the neck portion 20 of the connector fitting 210. The wrench 284 is a two part wrench that is assembled on the connector fitting 210. The bifurcation of the wrench 284 may be made in a variety of ways, including at the central axis 284g, or at the base of one of the legs 284c, the latter being depicted in FIG. 7C by a bifurcation joint 284h.

Figure 8A:
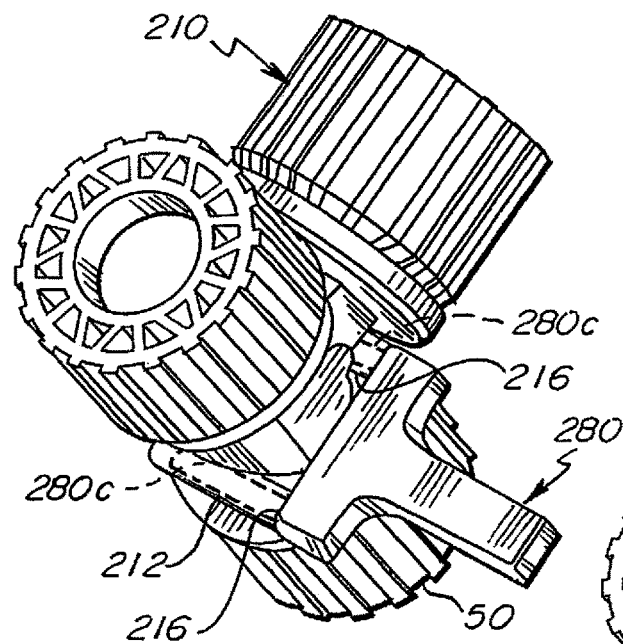
FIGS. 8A through 8C illustrate the use of the wrenches shown in FIGS. 7A through 7C, respectively, in embodiments of the disclosure.
Figure 8B:
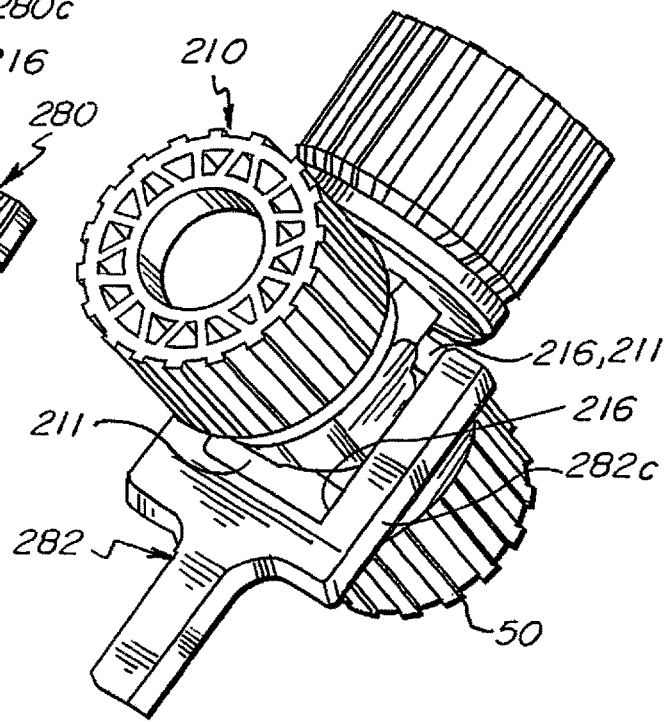
Figure 8C:
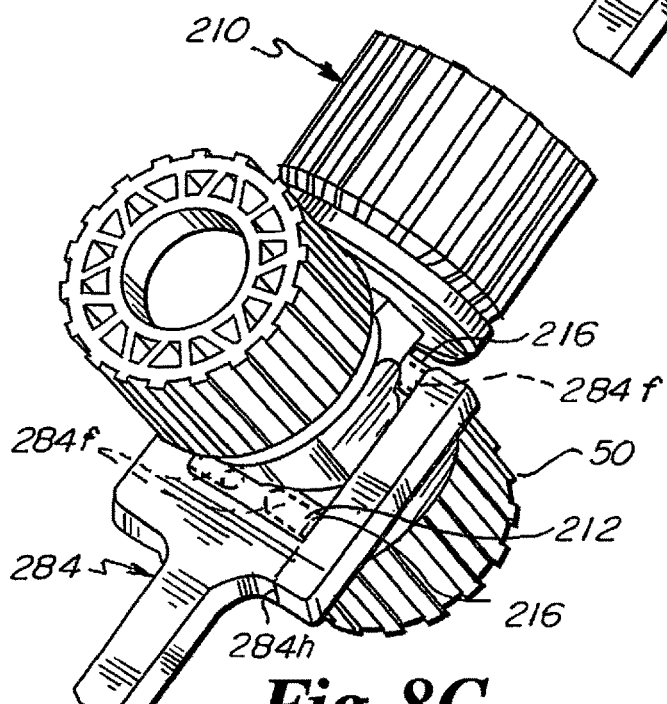

Referring to FIGS. 8A through 8C, the wrenches 280, 282, and 284 are depicted in operation, respectively, in embodiments of the disclosure. For the wrench 280 (FIG. 8A), the pins 280c are inserted into tubular portions 212 of the connector fitting 210. Using the wrench 280 to stabilize the connector fitting 210, the nut 50 can then be tightened onto the connector fitting 210, for example using the wrench 180 in the manner described attendant to FIGS. 5A through 5C. The torsion of the nut 50 applies a bending moment and a shear load on the pins 280c, and may also cause one of the tubular portions 212 to bear against the body 280b.

For the wrench 282 (FIG. 8B), the legs 828c are slid over opposing ends 216 of the spacers 211 of the neck portion 20. The inside faces 282e register against the opposing ends 216 of the spacers 211 to stabilize the connector fitting 210. Using the wrench 282 to stabilize the connector fitting 210, the nut 50 can then be tightened onto the connector fitting 210, for example using the wrench 180 in the manner described attendant to FIGS. 5A through 5C. During torsion of the nut 50, the ends 216 of the spacers 211 may bear against the inside faces 282e of the legs 282c to counter the force generated by the torsion of the nut 50.

For the wrench 284 (FIG. 8C), the pin(s) 284f of a first portion of the bifurcated wrench 284 (for example, the handle 284a, body 284b, and leg 284c that is not bifurcated of FIG. 7C) is inserted into the end(s) 216 of the tubular portion(s) 212 of the neck portion 20. Then, the pin(s) 284f of a second portion of the bifurcated wrench 284 (for example, the leg 284c that is bifurcated in FIG. 7C) is inserted into the opposing end(s) 216 of the tubular portion (s) 212 of the neck portion 20. After the pins 284f are inserted into tubular portions 212, the two portions of the bifurcated wrench 284 are then releasably joined by any of a variety of ways available to the artisan (e.g., with a fastener, clamp, and/or sleeve). Using the wrench 284 to stabilize the connector fitting 210, the nut 50 can then be tightened onto the connector fitting 210, for example using the wrench 180 in the manner described attendant to FIGS. 5A through 5C. The torsion of the nut 50 applies a bending moment and a shear load on the pins 284f, and may also cause one of the tubular portions 212 to bear against the one or more of the legs 284c.

In various embodiments, a set of installation instructions for installing the connector fitting 210 pursuant to the assembly description attendant to one or more of FIGS. 8A through 8C are provided on a tangible and non-transitory medium. The installation instructions may be provided with the fitting 210 and/or one or more of the wrenches 280, 282, 284 as part of a kit.

Figures 9A, 9B, 9C:
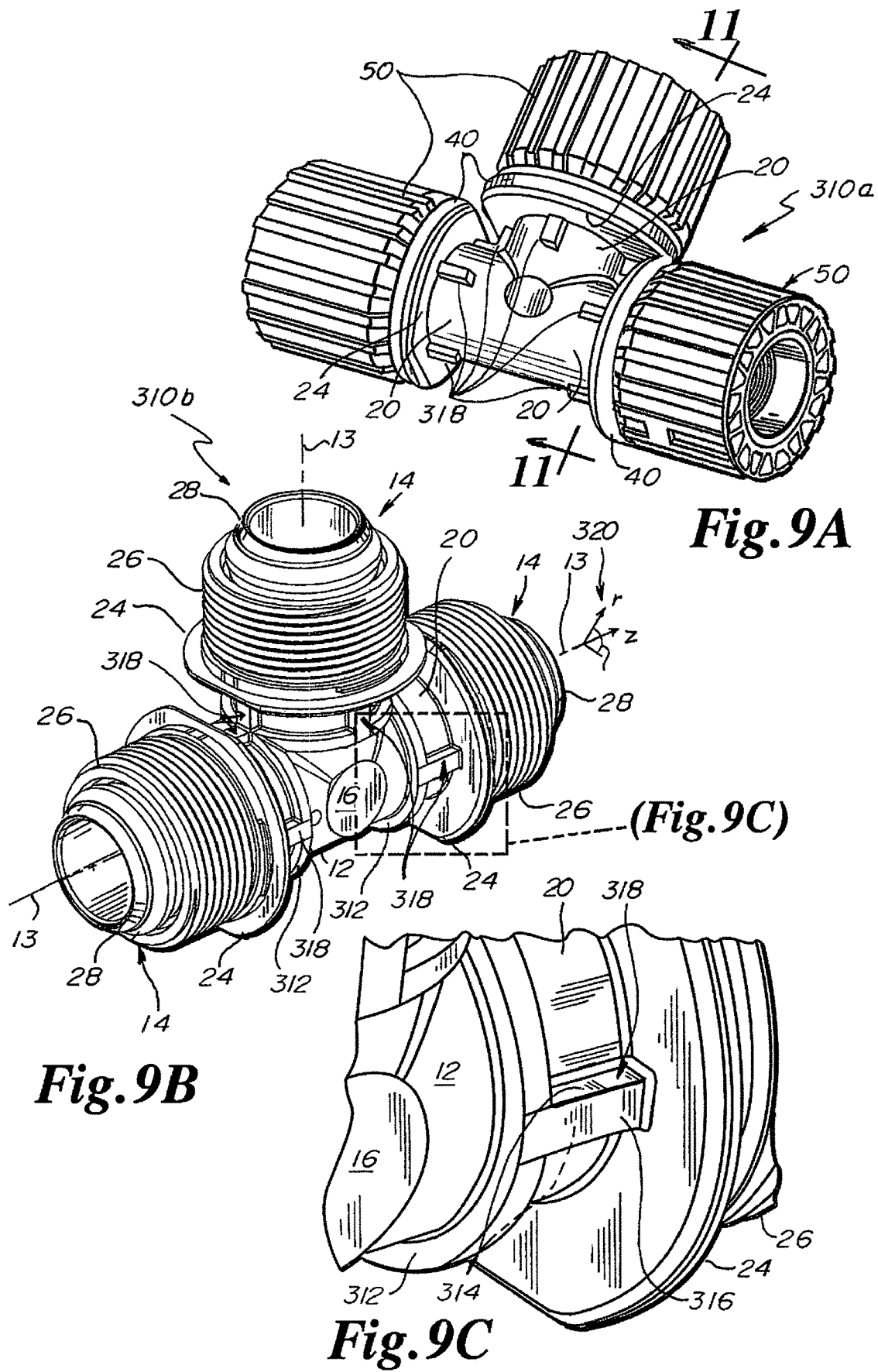
FIG. 9A is a front perspective view of a connector fitting in an embodiment of the disclosure.
FIG. 9B is a front perspective view of a body and coupling legs of a connector fitting in an embodiment of the disclosure.
FIG. 9C is a partial enlarged view of FIG. 9B.

Referring to FIGS. 9A through 9C, connector fittings 310a and 310b are depicted in embodiments of the disclosure. The connector fittings 310a, 310b are referred to collectively and generically as connector fitting(s) 310, and may include many of the same components and attributes as the connector fittings 10 and 210, which are indicated with same-numbered numerical references. For the connector fittings 310, the locking features 21 of the neck portion 20 are protrusions 318. The protrusions 318 are positioned about the neck portion 20 at uniform angular intervals (e.g., four protrusions 318 spaced at 90° about the leg axis 13, as depicted in FIGS. 9A and 9B), and may extend parallel to the leg axis 13 of the respective coupling leg 14.

In some embodiments (e.g. connector fitting 310b of FIGS. 9B and 9C), the locking features 21 include a flange 312 concentric about the respective leg axis 13 and extending radially outward from the neck portion 20, with the protrusions 318 extending distally from the flange portion 312 and proximally from the shoulder portion 24. In some embodiments, the protrusions 318 each define a cubic shape, with opposing flat sides 314 facing tangentially and a flat top 316 facing radially outward. (Herein, "tangentially" is in a θ direction of a right-cylindrical coordinate system 320, and "radially" is in a radial direction of the right-cylindrical coordinate system 320.)

Figure 10:
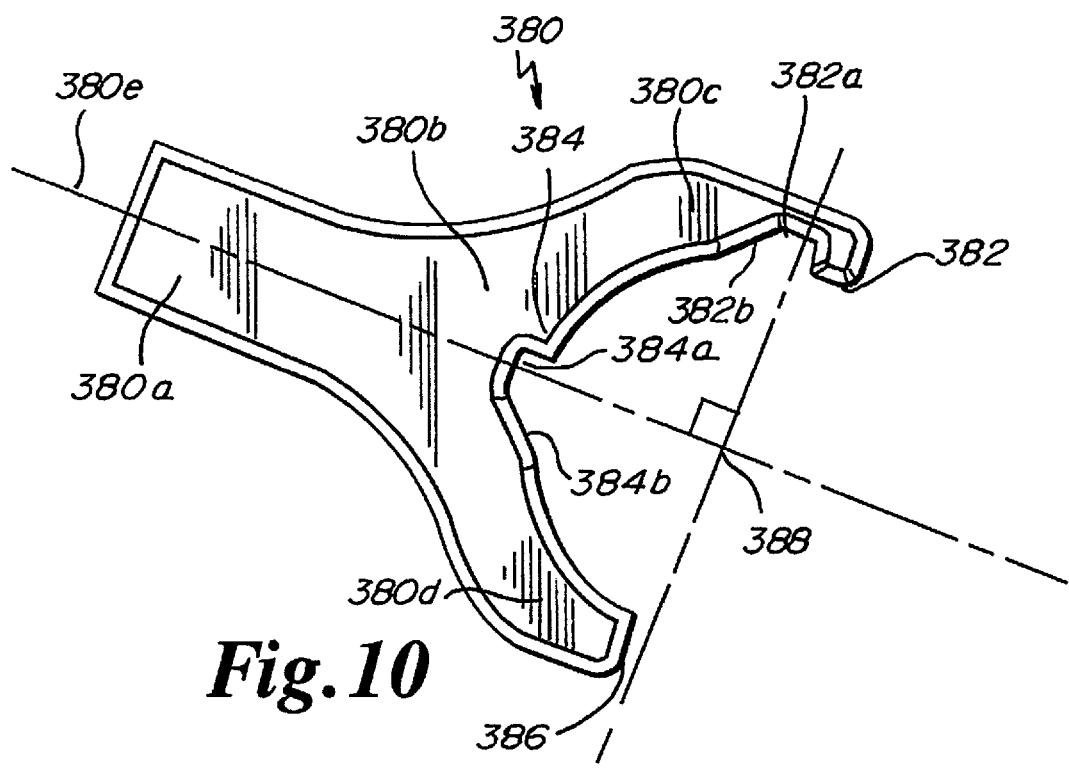
FIG. 10 is a plan view of a specialized wrench for tightening the fitting of FIG. 9 in an embodiment of the disclosure.

Referring to FIG. 10, a wrench 380 designed for use with connector fitting 310 is depicted in an embodiment of the disclosure. The wrench 380 includes a handle portion 380a, a body portion 380b, a first leg 380c and a second leg 380d. The handle portion 380a is centered about a handle axis 380e. The wrench 380 also has a tooth 382 that cooperates with the first leg 380c to define a notch 382a on the leg 380c, and a tooth 384 that cooperates with the body 380b to define a notch 384a. The end of the second leg 380d defines end boss 386. In the depicted embodiment, the notches 382a and 384a are centered about a rotation axis 388. In one embodiment, the notches 382a and 384a are centered about a right angle about the rotation axis 388, corresponding to the connector fitting 310 having four protrusions 318 tangentially spaced at 90°. In general, other angles about the rotation axis 388 are contemplated, corresponding to other distributions of protrusions 318 (120° for three protrusions 318, 72° for five protrusions 318, 60° for six protrusions, etc.). The notches 382a and 384a may each define a lead-in 382b and 384b, respectively. In the depicted embodiment, the notch 384a is centered about the handle axis 380e.

Figure 11:
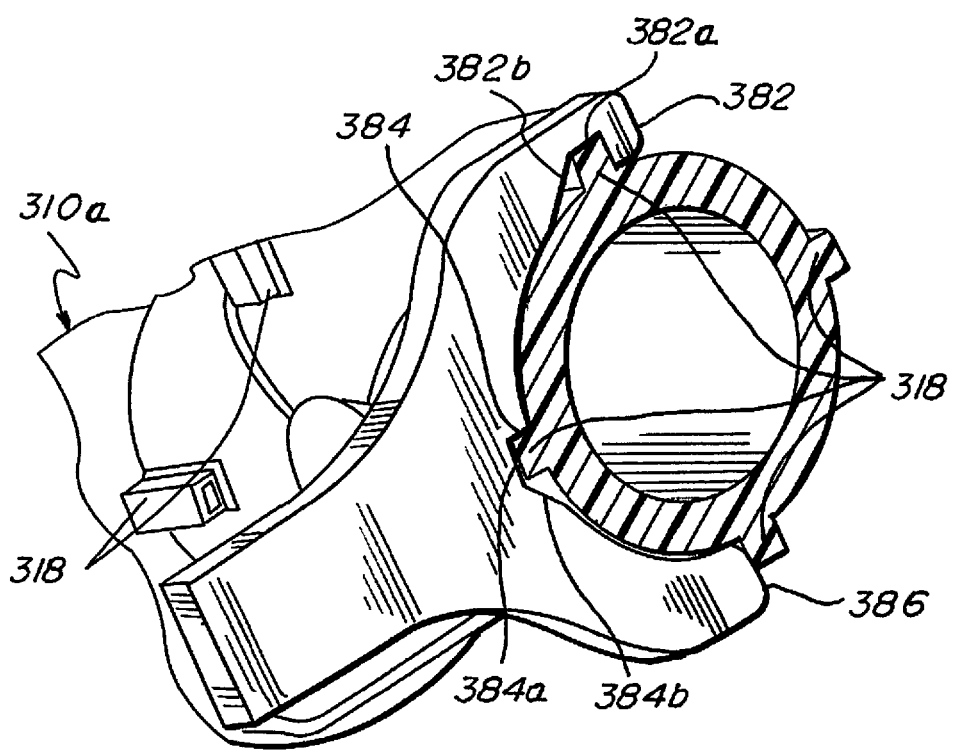
FIG. 11 is a partial, sectional view of the wrench of FIG. 10 engaged with the connector fitting of FIG. 9.

Referring to FIG. 11, engagement of a wrench 380 at section 11-11 of FIG. 9A is depicted in an embodiment of the disclosure. In operation, the notches 382a and 384a and the end boss 386 engage respective protrusions 318. The tooth 382 is brought into engagement with one of the sides 314 of one of the protrusions 318, and the wrench 380 rotated about the engaged protrusion 318 until the tooth 384 and the end boss 386 are brought into contact with respective protrusions 318. When fully engaged, each tooth 382 and 384 are in contact with one of the flat sides 314 and the flat top 316 of a respective protrusion 318, and the end boss 386 is in contact with one of the sides 314 of a respective protrusion 318. The lead-ins 382b and 384b are dimensioned to enable the wrench 380 to slide or pass over the respective protrusions 318 during this rotational motion. Those of skill in the art will appreciate that if the nut 50 is tightened by a clockwise rotation, the wrench 380 engages protrusions 318 so as to apply a counterclockwise torsional force to the connector fitting 310 for tightening of the nut 50.

In various embodiments, a set of installation instructions for installing the connector fittings 310 pursuant to the assembly description attendant to FIG. 11 are provided on a tangible and non-transitory medium. The installation instructions may be provided with the fittings 310 and/or the wrench 380 as part of a kit.

Figure 12:
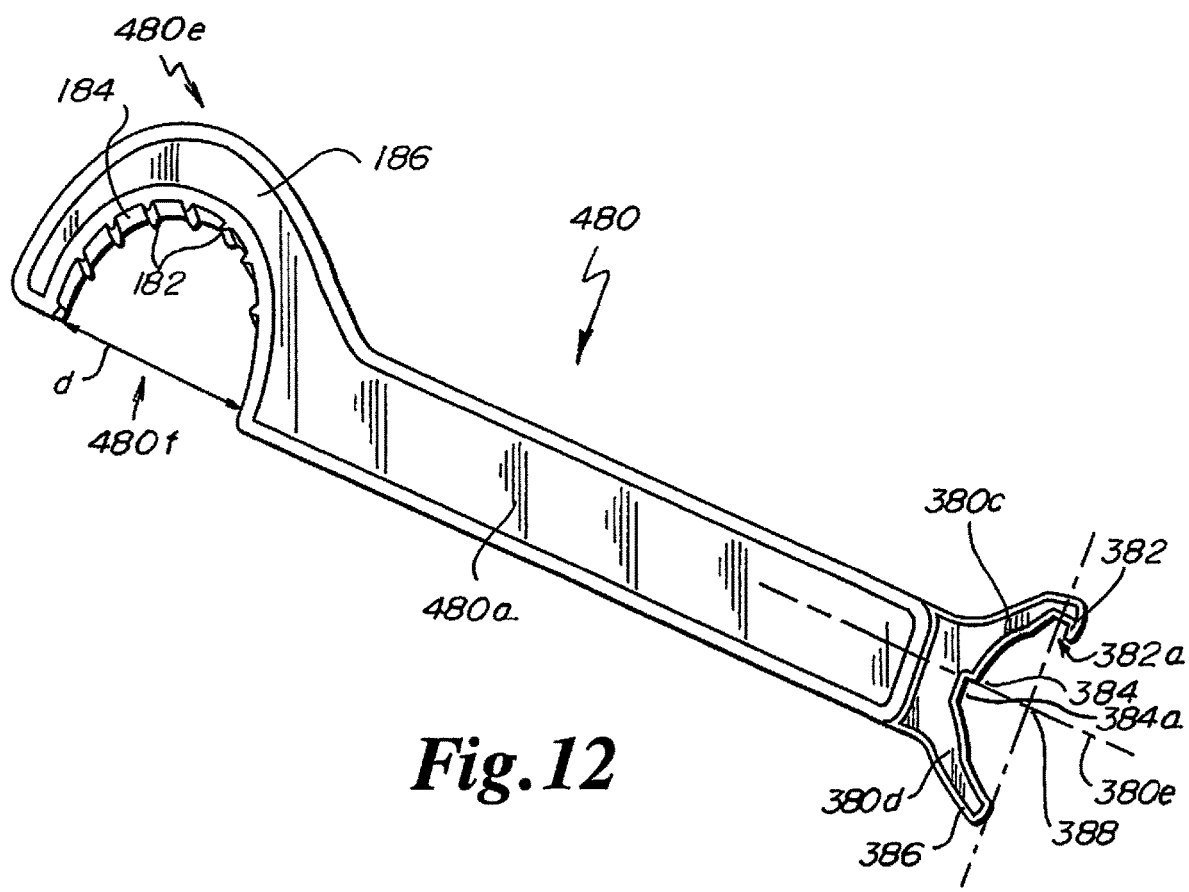
FIG. 12 is a perspective view of a specialized wrench for tightening the connector fittings of FIGS. 2A and 9 in an embodiment of the disclosure.

Referring to FIG. 12, a two-headed wrench 480 is depicted in an embodiment of the disclosure. The two-headed wrench 480 has a handle portion 480a, a first head 480b, and a second head 480e. The first head 480b has many of the same components and attributes as the wrench 380 (FIG. 10), which are indicated with same-numbered numerical references. In the embodiment of FIG. 12, the second head 480e is designed and configured to mate with the nut 50 and also with the locking ring 30 of the connector fitting 10 (e.g., FIG. 2A). Accordingly, the wrench head 480e includes a mouth 480f having a dimension 'd' appropriate to mate with the nut 50 and the locking ring 30, with the teeth 182 being spaced along the arcuate spanner portion 186 of the first head 480b for mating with the ribs 38 and 58 of the locking ring 30 and nut 50.

Functionally, the flat sides 314 and the flat top 316 of the protrusions 318 provide a corner (which may be sharp or radiused) for registration of the notches 382a and 384a and a normal bearing surface for registration of the end boss 386. The flat sides 316 and flat top 316 thus interact with the wrench surfaces at substantially normal angles to prevent or inhibit slipping of the wrench 380, 480 in operation.

In some embodiments, the wrench 380 is used to stabilize the connector fitting 310. The wrench 380 may be used in conjunction with another wrench, such as wrench 180 (FIG. 5A), wrench 380 (FIG. 10), or the first head 480b of another wrench 480. A second wrench is used to tighten the nut 50. Alternatively, the second head 480e of a two-headed wrench 480 may be used to stabilize the connector fitting 310, instead of the wrench 380.

Figure 13:
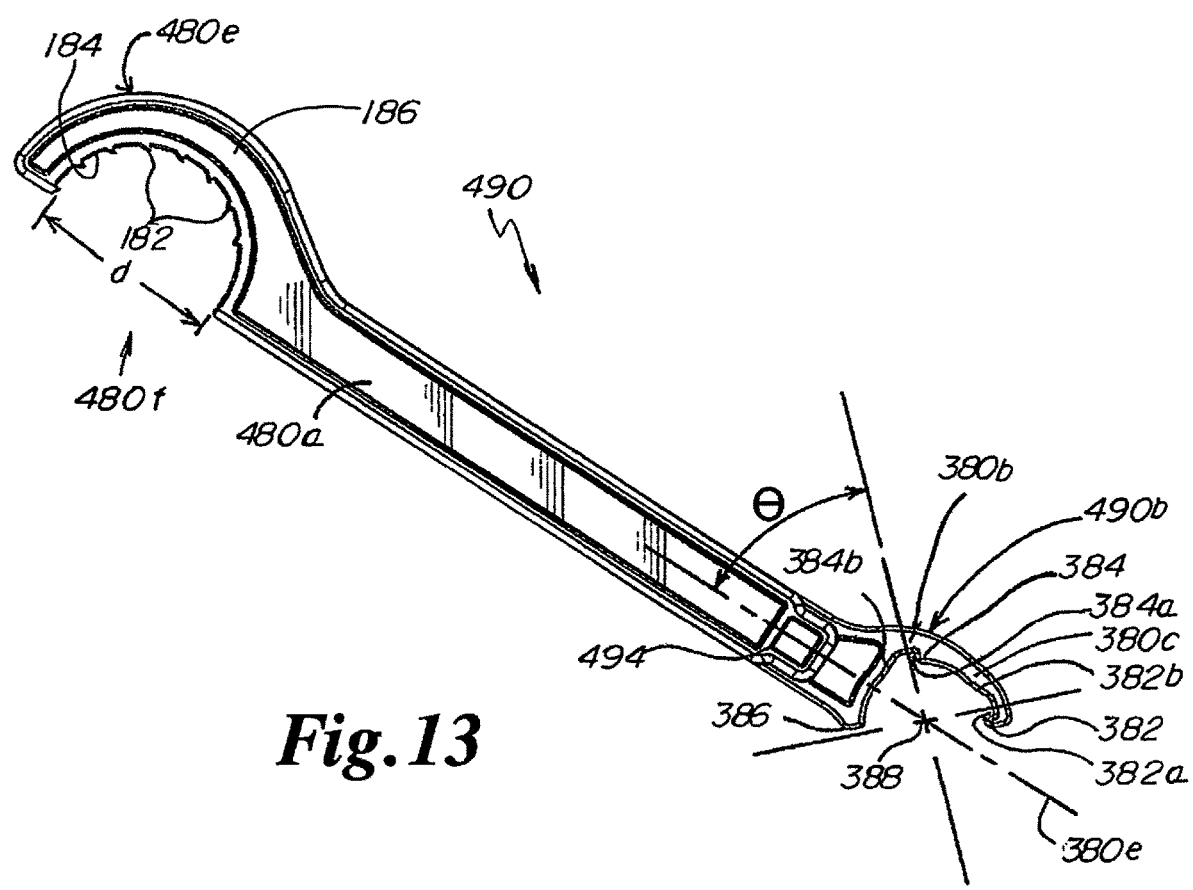
FIG. 13 is a perspective view of a modified specialized wrench for tightening the connector fittings of FIGS. 2A and 9 in an embodiment of the disclosure.

Referring to FIG. 13, a two-headed wrench 490 having a rotationally offset first head 490b is depicted in an embodiment of the disclosure. The two-headed wrench 490 includes many of the same components and attributes as the two-headed wrench 480, which are indicated with same-numbered numerical references. Also, the rotationally offset first head 490b includes many of the same components and attributes as the first head 480b, which are indicated with same-numbered numerical references. For the rotationally offset first head 490b, the notch 384a is centered at an angle θ that is rotationally offset from handle axis 380e about the rotation axis 388. In various embodiments, the angle θ is in the range of 15° to 60° inclusive. Non-limiting examples of the angle θ are 45° and 30°.

Functionally, the rotationally offset first head 490b enables the wrench to be coupled to the protrusions 318 of fittings 310 for applications where a "straight" wrench (i.e., wrench 380 or two-headed wrench 480, each having an effective θ=0°) cannot be effectively coupled to the fitting, for example because of being located between two external pieces of equipment that restricts angular access to the fitting 310.

In various embodiments, the handle portion 480a includes structure defining an aperture 494. The aperture 494 may be of a square shape, and dimensioned to accommodate the driver of a standard ratchet (e.g., a ½-inch or ¼-inch ratchet). The aperture 494 thereby enables coupling with a ratchet for applying a torsional force to the fitting 310. The aperture 494 is also useful for storing the wrench 480 or 490 on a hanging mount (e.g., a peg board) for ready access.

Figure 14:
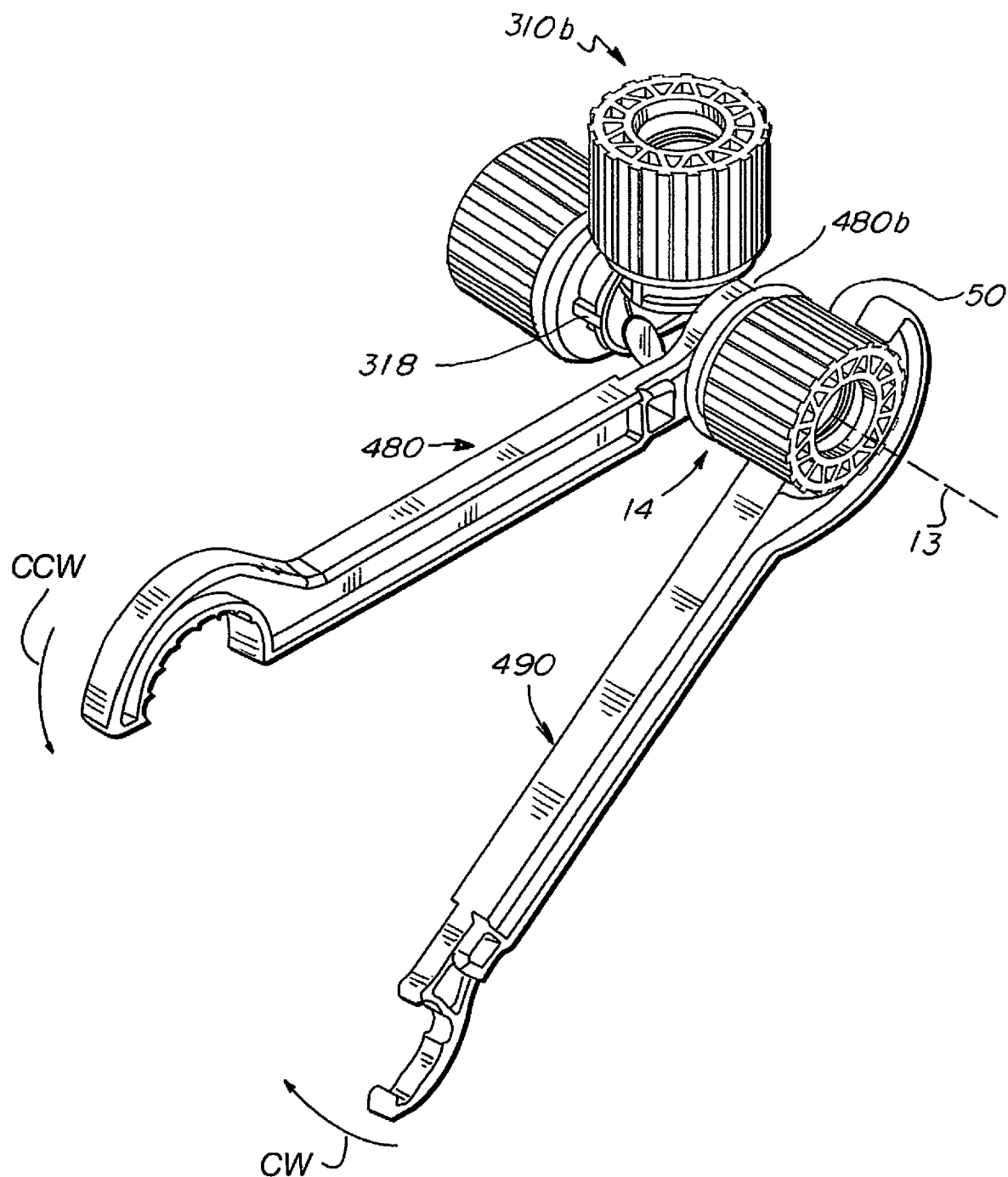
FIG. 14 is a perspective view of a tightening procedure for a connector fitting using the wrenches of FIGS. 12 and 13 in an embodiment of the disclosure.

Referring to FIG. 14, operation of a pair of two-headed wrenches is depicted in an embodiment of the disclosure. In the FIG. 14 depiction, a first of the pair of two-headed wrenches is the "straight" two-headed wrench 480 with the rotationally centered first head 480b and a second of the pair is the two-headed wrench 490 having the rotationally offset first head 490b. By this arrangement, the user can select which of the two-headed wrenches provides the most favorable access to the protrusions 318 of the neck portion 20, and use the second end 480e of the other of the pair of two-headed wrenches for adjustment of the nut 50 of the fitting 310. The two-headed wrenches 480 and 490 are then torqued in opposing rotational directions to secure the nut 50 to the coupling leg 14. In the depiction of FIG. 14, the two-headed wrench 480 is torqued counterclockwise (CCW) and the two-headed wrench 490 torqued clockwise (CW), the CCW and CW directions being about the leg axis 13 and relative to a distal-to-proximal end view of the coupling leg 14.

In various embodiments, a set of installation instructions for installing the connector fittings 310 pursuant to the assembly description attendant to FIG. 14 are provided on a tangible and non-transitory medium. The installation instructions may be provided with the fittings 310 and/or the wrenches 480, 490 as part of a kit.

It is further noted that pair of two-headed wrenches 480 and 490 are suitable for tightening not only the connector fitting 310, but also the connector fitting 10. That is, the second head 480e of one of the wrenches 480, 490 could be used to engage the locking ring 30 to stabilize the connector fitting 10, while the second head 480e of the other of the wrenches 490, 480 could be used to tighten the nut 50.

The various wrenches 380, 480, 490 depicted and described herein can be fabricated from a polymer material of suitable hardness to withstand the stresses of torque application, while providing some yield that mitigates damage of the fitting 310. In other embodiments, the wrenches 380, 480, 490 depicted and described herein are fabricated from a metal, such as aluminum or stainless steel. Metallic wrenches, being typically of higher strength, can generally be fabricated with less thickness that a polymer wrench for access to tighter spaces.

Various embodiments of the disclosure may also implement an anti-rotation device such as disclosed at International Publication No. WO 2015/061501, published Apr. 30, 2015, the disclosure of which is hereby incorporated by reference herein except for express definitions and patent claims contained therein. The anti-rotation device disclosed therein limits loosening rotation of the nut 50 that may occur due to, for example, thermal cycling or vibration.

Embodiments of the disclosure have been described in detail with respect to specific embodiments thereof, but it will be apparent that numerous variations and modifications are possible without departing from the spirit and scope of the inventive embodiments as defined by the claims. Likewise, one skilled in the art will recognize that the order of certain steps in the claims may be combined, deleted or rearranged without departing from the spirit and scope of the inventive embodiments.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant art will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is limited such that any definitions provided in the documents are not incorporated by reference herein unless expressly included herein.

References to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. A connector fitting for fluid handling comprising:
   a coupling leg defining a bore that extends therethrough, said coupling leg and said bore being concentric about a leg axis, said coupling leg including a neck portion, a shoulder portion extending distal to said neck portion, a threaded portion extending distal to said shoulder portion, and a nipple portion extending distal to said threaded portion, said neck portion including locking features extending radially outward therefrom, wherein the locking features include a flange extending radially outward from said neck portion and a plurality of partitions extending distally from said flange, said flange and said plurality of partitions cooperating to define a plurality of pockets;
   a locking ring that defines and is concentric about a locking ring axis, said locking ring including an inner surface that includes one or more tabs that project radially inward toward said locking ring axis, said one or more tabs being configured to mate within one or more of the plurality of pockets; and
   a nut threadably engaged with said threaded portion of the coupling leg,
   wherein said coupling leg and said nut are made of a melt processible resin.

2. The connector fitting of claim 1, wherein said one or more tabs of said locking ring are disposed within said one or more of said plurality of pockets of said neck portion, said partitions contacting with said one or more tabs to limit said locking ring to a within a range of rotation about said locking ring axis relative to said neck portion.

3. The connector fitting of claim 2, wherein said range of rotation is less than 15 degrees.

* * * * *